United States Patent
Kim et al.

(10) Patent No.: US 10,787,532 B2
(45) Date of Patent: *Sep. 29, 2020

(54) THERMOPLASTIC RESIN COMPOSITION AND ARTICLE MANUFACTURED USING THE SAME

(71) Applicant: Lotte Advanced Materials Co., Ltd., Yeosu-si (KR)

(72) Inventors: Yoen Kyoung Kim, Uiwang-si (KR); Seung Yong Bae, Uiwang-si (KR); Cheon Seok Yang, Uiwang-si (KR); Ju Sung Kim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 205 days.

This patent is subject to a terminal disclaimer.

(21) Appl. No.: 15/844,980

(22) Filed: Dec. 18, 2017

(65) Prior Publication Data

US 2018/0179314 A1 Jun. 28, 2018

(30) Foreign Application Priority Data

Dec. 22, 2016 (KR) .................. 10-2016-0176575

(51) Int. Cl.

| | | |
|---|---|---|
| *C08L 33/12* | (2006.01) | |
| *C08L 25/14* | (2006.01) | |
| *C08L 25/12* | (2006.01) | |
| *C08L 77/12* | (2006.01) | |
| *C08K 3/22* | (2006.01) | |
| *A01N 25/10* | (2006.01) | |
| *C08F 220/18* | (2006.01) | |
| *C08F 212/04* | (2006.01) | |
| *C08G 69/40* | (2006.01) | |
| *C08G 69/44* | (2006.01) | |
| *C08G 81/00* | (2006.01) | |
| *C08K 3/20* | (2006.01) | |
| *C01G 9/02* | (2006.01) | |

(52) U.S. Cl.
CPC ............ *C08F 220/18* (2013.01); *A01N 25/10* (2013.01); *C08F 212/04* (2013.01); *C08G 69/40* (2013.01); *C08G 69/44* (2013.01); *C08G 81/00* (2013.01); *C08K 3/20* (2013.01); *C08K 3/22* (2013.01); *C08L 25/12* (2013.01); *C08L 25/14* (2013.01); *C08L 33/12* (2013.01); *C08L 77/12* (2013.01); *C01G 9/02* (2013.01); *C01P 2002/72* (2013.01); *C08K 2003/2296* (2013.01)

(58) Field of Classification Search
CPC .......... C08L 33/08; C08L 33/10; C08L 33/12; C08L 77/12; C08L 25/14; C08L 35/06; C08K 2003/2296; C08K 3/22
See application file for complete search history.

(56) References Cited

U.S. PATENT DOCUMENTS

| | | | |
|---|---|---|---|
| 3,041,303 A | 6/1962 | Nelson | |
| 3,354,108 A | 11/1967 | Paradis et al. | |
| 4,331,786 A * | 5/1982 | Foy .................. | C08G 69/44 525/408 |
| 4,356,300 A | 10/1982 | Isler et al. | |
| 4,612,340 A | 9/1986 | Ohachi | |
| 5,714,534 A | 2/1998 | Kojima et al. | |
| 5,714,545 A | 2/1998 | Lee et al. | |
| 5,906,679 A * | 5/1999 | Watanabe .............. | B82Y 30/00 106/286.6 |
| 6,166,116 A | 12/2000 | Sleeckx | |
| 6,297,307 B1 | 10/2001 | Eichenauer et al. | |
| 6,663,877 B1 | 12/2003 | Appleton et al. | |
| 8,128,998 B2 | 3/2012 | Li et al. | |
| 2002/0106413 A1 | 8/2002 | Herbst et al. | |
| 2002/0109805 A1 | 8/2002 | Baba | |
| 2003/0125413 A1 | 7/2003 | Herbst et al. | |
| 2005/0043485 A1 | 2/2005 | Lee et al. | |
| 2005/0131100 A1 | 6/2005 | Herbst et al. | |
| 2007/0009691 A1 | 1/2007 | Barre et al. | |
| 2007/0049678 A1 | 3/2007 | Kim et al. | |
| 2010/0264383 A1 | 10/2010 | Tooley et al. | |
| 2014/0017335 A1* | 1/2014 | Dimov ................. | C08K 5/0058 424/618 |

(Continued)

FOREIGN PATENT DOCUMENTS

| | | |
|---|---|---|
| CN | 1710153 A1 | 12/2005 |
| CN | 1919542 A | 2/2007 |

(Continued)

OTHER PUBLICATIONS

Machine translated English language equivalent of H09-061580, which is the same as JP Publication JP 10251444 (1998, 14 pages).*
Google translation of JP 11035787 (1999, 8 pages).*
Google translation of JP 06287547 (1994, 5 pages).*
Office Action in commonly owned Chinese Application No. 201711007395.8 dated Jul. 31, 2019, pp. 1-6.
Office Action in counterpart Korean Application No. 10-2016-0176575 dated Nov. 1, 2018, pp. 1-7.

(Continued)

*Primary Examiner* — Brieann R Johnston
(74) *Attorney, Agent, or Firm* — Additon, Higgins & Pendleton, P.A.

(57) ABSTRACT

A thermoplastic resin composition and a molded article manufactured using the same. The thermoplastic resin composition includes: a base resin including a poly(alkyl (meth) acrylate) resin and an aromatic vinyl copolymer; a polyether-ester-amide block copolymer; and zinc oxide having an average particle diameter of about 0.2 μm to about 3 μm and a BET specific surface area of about 1 m²/g to about 20 m²/g, wherein the aromatic vinyl copolymer is a copolymer of an alkyl (meth)acrylate, an aromatic vinyl monomer, and a monomer copolymerizable with the aromatic vinyl monomer.

13 Claims, 1 Drawing Sheet

(56) References Cited

U.S. PATENT DOCUMENTS

| | | | |
|---|---|---|---|
| 2015/0284559 A1* | 10/2015 | Tai | C08L 55/02 525/184 |
| 2016/0326670 A1 | 11/2016 | Kang et al. | |
| 2017/0198132 A1 | 7/2017 | Choi et al. | |
| 2018/0112056 A1 | 4/2018 | Yang et al. | |
| 2018/0118914 A1 | 5/2018 | Bae et al. | |
| 2018/0179314 A1 | 6/2018 | Kim et al. | |
| 2018/0179373 A1 | 6/2018 | Kim et al. | |
| 2018/0186989 A1 | 7/2018 | Lee et al. | |
| 2019/0299572 A1* | 10/2019 | Hirabayashi | B32B 27/16 |

FOREIGN PATENT DOCUMENTS

| | | | |
|---|---|---|---|
| CN | 101001805 A | | 7/2007 |
| CN | 101880426 A | | 11/2010 |
| CN | 107974030 A | | 5/2018 |
| EP | 1190622 A1 | | 3/2002 |
| EP | 1510549 A1 | | 3/2005 |
| EP | 3026082 A1 | * | 6/2016 ............ C08F 279/02 |
| EP | 3026082 A1 | | 6/2016 |
| EP | 3326975 A1 | * | 5/2018 ............ A01N 59/16 |
| EP | 3339367 A1 | | 6/2018 |
| EP | 3339370 A | | 6/2018 |
| FR | 1439417 A | | 5/1966 |
| GB | 1040287 A | | 8/1966 |
| JP | 55-133424 A | | 10/1980 |
| JP | 56-045419 A | | 4/1981 |
| JP | 06287547 A | * | 10/1994 |
| JP | 08-253640 A | | 10/1996 |
| JP | 10-182927 A | | 7/1998 |
| JP | H10195309 A | | 7/1998 |
| JP | 10-251444 A | | 9/1998 |
| JP | 10251444 A | * | 9/1998 |
| JP | 11-035787 A | | 2/1999 |
| JP | 2001-220486 A | | 8/2001 |
| JP | 2006-182841 A1 | | 7/2006 |
| JP | 2014-172783 A | | 9/2014 |
| JP | 2014-221708 A | | 11/2014 |
| JP | 2016-121273 A | | 7/2016 |
| KR | 10-2002-0008203 A | | 1/2002 |
| KR | 10-0696385 B1 | | 3/2007 |
| KR | 10-2007-0047073 A | | 5/2007 |
| KR | 10-2010-0087603 A | | 8/2010 |
| KR | 10-1334283 B1 | | 11/2013 |
| KR | 10-1452020 A | | 10/2014 |
| KR | 10-2016-0083527 A | | 7/2016 |

OTHER PUBLICATIONS

Prasanna, et al. "Insight into the Mechanism of Antibacterial Activity of ZnO: Surface Defects Mediated Reactive Oxygen Species Even in the Dark", Langmuir 2015, vol. 31, pp. 9155-9162.

Office Action in commonly owned U.S. Appl. No. 15/845,020 dated Aug. 8, 2019, pp. 1-13.
Machine translated English language equivalent of JP Application No. H09-212736, which is the same as publication JP 11-035787 (1999, 10 pages).
Machine translated English language equivalent of CN 191542 (2007, 5 pages).
Office Action in commonly owned Korean Application No. 10-2016-0177857 dated Nov. 20, 2018, pp. 1-8.
Extended Search Report in commonly owned European Application No. 17210117.2, dated Apr. 30, 2018, pp. 1-5.
Search Report in commonly owned European Application No. 17210669.2 dated Apr. 20, 2018, pp. 1-5.
Office Action in commonly owned Korean Application No. 10-2016-0184170 dated Sep. 6, 2018, pp. 1-6.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2017-0111807 dated Nov. 27, 2018, pp. 1-9.
Chandrakanth et al., "Synthesis and characterization of ZnO nanorods with a narrow size distribution", Royal Society of Chemistry, 2015, vol. 5, pp. 49861-49870 (17 pages).
Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.
Machine translated English language equivalent of CN 101880426 (2010, 5 pages).
Machine translated English language equivalent of JP 2014-221708 (2014, 9 pages).
Extended Search Report in commonly owned European Application No. 17199720.8 dated Mar. 7, 2018, pp. 1-7.
Database WPI, Week 201463, Thomson Scientific, London, GB, Abstract of JP 2014-172783 (UBE Kagaku Kogyo KK), pp. 1-2.
Database WPI, Week 201654, Thomson Scientific, London, GB, Abstract of KR 2016-0083527 (Kolon Plastics Inc.), pp. 1-2.
Office Action in commonly owned U.S. Appl. No. 15/798,319 dated May 13, 2019, pp. 1-20.
Extended Search Report in counterpart European Application No. 17209267.8 dated Mar. 26, 2018, pp. 1-7 [Japanese Patent No. JP 2016 121273 A previously cited].
Office Action in commonly owned Chinese Application No. 201711062077.1 dated Jul. 12, 2019, pp. 1-7.

* cited by examiner (a) Example 1  (b) Comparative Example 1

(a) Example 1  (b) Comparative Example 1

THERMOPLASTIC RESIN COMPOSITION AND ARTICLE MANUFACTURED USING THE SAME

CROSS-REFERENCE TO RELATED APPLICATION

This application claims priority under 35 USC Section 119 to and the benefit of Korean Patent Application 10-2016-0176575, filed on Dec. 22, 2016, the entire disclosure of which is incorporated herein by reference.

FIELD

The present invention relates to a thermoplastic resin composition and a molded article manufactured using the same.

BACKGROUND

Recently, demand for thermoplastic resin products having an antibacterial function tends to increase corresponding to increasing income level and attention to personal health and hygiene. Hence, thermoplastic resin products subjected to antibacterial treatment so as to suppress or remove bacteria from surfaces of daily supplies and electronic products have increased in number, and it is a very important issue to develop an antibacterial material (antibacterial thermoplastic resin composition) having stability and reliability.

In order to prepare such an antibacterial thermoplastic resin composition, it is necessary to add an antibacterial agent. The antibacterial agent may be classified as an organic antibacterial agent or an inorganic antibacterial agent.

Organic antibacterial agents are relatively inexpensive and can provide good antibacterial effects even with a small amount. Organic antibacterial agents, however, can often exhibit toxicity to the human body, provide inherent antibacterial effects against specific bacteria, and be decomposed to lose inherent antibacterial effects upon processing at high temperature. Moreover, since organic antibacterial agents can cause discoloration after processing and can have short antibacterial durability due to a problem of elution, there are limited applications for organic antibacterial agents in antibacterial thermoplastic resin compositions.

Inorganic antibacterial agents are antibacterial agents containing a metallic component, such as silver (Ag) or copper (Cu). Although inorganic antibacterial agents are widely used in preparation of antibacterial thermoplastic resin compositions (antibacterial resins) due to good thermal stability thereof, inorganic antibacterial agents are typically added in large amounts due to lower antibacterial effects than organic antibacterial agents. Moreover, there can be various problems associated with inorganic antibacterial agents, such as relatively high price, difficulty in uniform dispersion during processing, and discoloration due to the metallic component, and thus they can also have limited uses.

Therefore, there is a need for a thermoplastic resin composition which can have good antibacterial properties (activity) and/or antibacterial durability, as well as other properties.

SUMMARY OF THE INVENTION

Embodiments provide a thermoplastic resin composition which can have good properties in terms of antibacterial properties (activity), antistatic performance, abrasion resistance, chemical resistance, impact resistance, and/or reliability, and a molded article formed of the same.

The thermoplastic resin composition includes: a base resin including a poly(alkyl (meth)acrylate) resin and an aromatic vinyl copolymer; a polyether-ester-amide block copolymer; and zinc oxide, wherein the zinc oxide has an average particle diameter of about 0.2 μm to about 3 μm and a BET specific surface area of about 1 m$^2$/g to about 20 m$^2$/g.

The thermoplastic resin composition may include: about 100 parts by weight of the base resin including about 40 wt % to 95 wt % of the poly(alkyl (meth)acrylate) resin and about 5 wt % to 60 wt % of the aromatic vinyl copolymer; about 5 parts by weight to about 50 parts by weight of the polyether-ester-amide block copolymer; and about 0.01 parts by weight to about 5 parts by weight of the zinc oxide.

In the base resin, a weight ratio of the poly(alkyl (meth)acrylate) resin to the aromatic vinyl copolymer may range from about 1:0.1 to about 1:0.6.

A weight ratio of the poly(alkyl (meth)acrylate) resin to the polyether-ester-amide block copolymer may range from about 1:0.1 to about 1:1.

The aromatic vinyl copolymer may be a copolymer of about 65 wt % to about 80 wt % of an alkyl (meth)acrylate, about 10 wt % to about 30 wt % of an aromatic vinyl monomer, and about 2 wt % to about 10 wt % of a monomer copolymerizable with the aromatic vinyl monomer.

The polyether-ester-amide block copolymer may include about 10 wt % to about 95 wt % of a polyether-ester block.

The zinc oxide may have a peak position degree (2θ) in the range of 35° to 37° and a crystallite size of about 500 Å to about 2,000 Å in analysis of X-ray diffraction (XRD), as calculated by Equation 1:

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

The zinc oxide may have a peak intensity ratio (B/A) of about 0.01 to about 15.0, where A indicates a peak in the wavelength range of 370 nm to 390 nm and B indicates a peak in the wavelength range of 450 nm to 600 nm in photoluminescence measurement. For example, the zinc oxide may have a peak intensity ratio (B/A) of about 0.01 to about 1.0, where A indicates a peak in the wavelength range of 370 nm to 390 nm and B indicates a peak in the wavelength range of 450 nm to 600 nm in photoluminescence measurement.

The thermoplastic resin composition may have an impact resistance of about 900 mm or higher, wherein the impact resistance indicates a height from which dropping a 1 kg metal tip results in cracking of a 3.2 mm thick specimen in a Dupont drop impact test.

The thermoplastic resin composition may have an antibacterial activity of about 2.0 to about 7.5 (against *Staphylococcus*) and about 2.0 to about 7.5 (against *Escherichia coli*), as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

The thermoplastic resin composition may have a surface resistance of about $10^5$ Ω·cm to about $10^{10}$ Ω·cm, as measured in accordance with ASTM D257.

Other embodiments relate to a molded article formed of the thermoplastic resin composition as set forth above.

DETAILED DESCRIPTION

Figure 1:
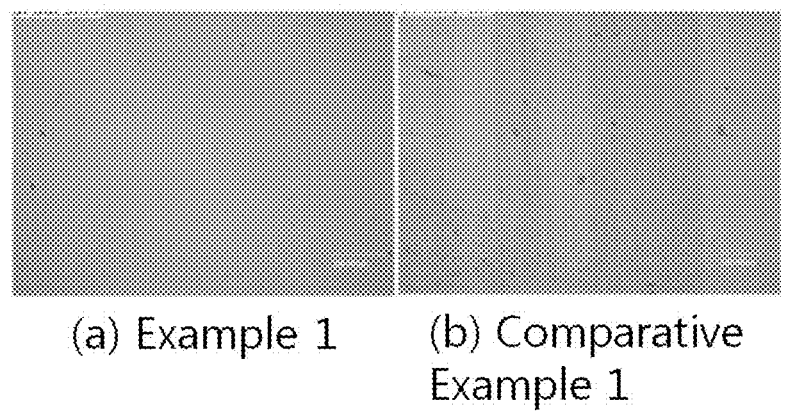
FIG. 1(a) shows a result of evaluating abrasion resistance of Example 1 according to the present invention.
FIG. 1(b) shows a result of evaluating abrasion resistance of Comparative Example 1.

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Further, terms to be described later are terms defined in consideration of functions of the present invention, and these may vary with the intention or practice of a user or an operator. Therefore, such terms should be defined based on the entire content disclosed herein.

Herein, "(meth)acrylate" may include acrylate and/or methacrylate. In addition, "(meth)acrylic" in "(meth)acrylic compound" may include acrylic and/or methacrylic.

In accordance with embodiments, a thermoplastic resin composition includes: (A) a base resin; (B) a polyetherester-amide block copolymer; and (C) zinc oxide.

(A) Base Resin

The base resin (A) according to embodiments of the present invention includes: (A1) a poly(alkyl (meth)acrylate) resin; and (A2) a copolymer of an alkyl (meth)acrylate, an aromatic vinyl monomer, and a monomer copolymerizable with the aromatic vinyl monomer.

(A1) Poly(Alkyl (Meth)Acrylate) Resin

The poly(alkyl (meth)acrylate) resin (A1) may be a polymer including about 60% by weight (wt %) or more of a $C_1$ to $C_{14}$ alkyl group-containing (meth)acrylate monomer. For example, the $C_1$ to $C_{14}$ alkyl group-containing (meth)acrylate monomer can be present in an amount of about 60 wt % to 100 wt % in the poly(alkyl (meth)acrylate) resin (A1). In some embodiments, the poly(alkyl (meth)acrylate) resin may include the $C_1$ to $C_{14}$ alkyl group-containing (meth)acrylate monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments, the amount of the $C_1$ to $C_{14}$ alkyl group-containing (meth)acrylate monomer can be in a range from about any of the foregoing amounts to about any other of the foregoing amounts. Within this range, the thermoplastic resin composition can have good properties in terms of impact resistance and/or moldability.

In one embodiment, the poly(alkyl (meth)acrylate) resin may be a polymer including at least one (meth)acrylate monomer selected without limitation from among methyl acrylate, ethyl acrylate, butyl acrylate, 2-ethylbutyl acrylate, 2-ethylhexyl acrylate, hexyl acrylate, heptyl acrylate, octyl acrylate, n-pentyl acrylate, vinyl acrylate, lauryl acrylate, methyl methacrylate, ethyl methacrylate, butyl methacrylate, 2-ethylbutyl methacrylate, 2-ethylhexyl methacrylate, and/or lauryl methacrylate.

In one embodiment, the poly(alkyl (meth)acrylate) resin may include without limitation at least one of poly(methyl (meth)acrylate), poly(butyl (meth)acrylate), poly(decyl (meth)acrylate), poly(dodecyl (meth)acrylate), and/or poly (tridecyl (meth)acrylate). For example, the poly(alkyl (meth)acrylate) resin may be poly(methyl (meth)acrylate).

In one embodiment, the poly(alkyl (meth) acrylate) resin may be prepared by adding a solvent and a polymerization initiator to the (meth)acrylate monomer, followed by polymerization. Here, polymerization may be performed by any typical polymerization, for example, mass polymerization, emulsion polymerization, and/or suspension polymerization, without being limited thereto.

In one embodiment, the solvent may include without limitation: methanol; ethers such as tetrahydrofuran, ethylene glycol monomethyl ether, ethylene glycol monoethyl ether, propylene glycol monomethyl ether acetate, methyl cellosolve acetate, ethyl cellosolve acetate, diethylene glycol monomethyl ether, and diethylene glycol monoethyl ether; and the like, and combinations thereof. In addition, the polymerization initiator may include 2,2'-azobisisobutyronitrile, 2,2'-azobis(2-4-dimethylvaleronitrile), and/or 2,2'-azobis(4-methoxy-2.4-dimethylvaleronitrile), without being limited thereto.

In one embodiment, the poly(alkyl (meth)acrylate) resin (A1) may have a melt flow index of about 0.5 g/10 min to about 20 g/10 min, as measured at 230° C. under a load of 10 kgf. Within this range, the thermoplastic resin composition can have good flowability thus good moldability and a molded article manufactured using the composition can have good properties in terms of appearance and/or impact resistance.

In one embodiment, the poly(alkyl (meth)acrylate) resin (A1) may be present in an amount of about 40 wt % to about 95 wt % based on the total weight (100 wt %) of the base resin (A) including the (A1) poly(alkyl (meth)acrylate) resin and (A2) copolymer of an alkyl (meth)acrylate. In some embodiments, the base resin may include the poly(alkyl (meth)acrylate) resin in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the poly(alkyl (meth)acrylate) resin can be in a range from about any of the foregoing amounts to about any other of the foregoing amounts. Within this range, the poly(alkyl (meth)acrylate) resin (A1) can have good compatibility and the thermoplastic resin composition can have good properties in terms of moldability and/or impact resistance.

For example, the poly(alkyl (meth)acrylate) resin (A1) may be present in an amount of about 55 wt % to about 95 wt % based on the total weight of the base resin (A). By way of another example, the poly(alkyl (meth)acrylate) resin (A1) may be present in an amount of about 65 wt % to about 90 wt % based on the total weight of the base resin (A). By way of a further example, the poly(alkyl (meth)acrylate) resin (A1) may be present in an amount of about 80 wt % to about 90 wt % based on the total weight of the base resin (A).

(A2) Aromatic Vinyl Copolymer

The aromatic vinyl copolymer (A2) may be obtained by mixing the alkyl (meth) acrylate with the aromatic vinyl monomer and the monomer copolymerizable with the aromatic vinyl monomer, followed by polymerization. Here, polymerization may be performed by any typical polymerization method known in the art, such as emulsion polymerization, suspension polymerization, and/or mass polymerization.

In one embodiment, the aromatic vinyl copolymer may be a copolymer of about 65 wt % to about 80 wt % of the alkyl (meth)acrylate, about 10 wt % to 30 wt % of the aromatic vinyl monomer, and about 2 wt % to about 10 wt % of the monomer copolymerizable with the aromatic vinyl monomer. When the amounts of the aforementioned components fall within these ranges, the thermoplastic resin composition can have good impact resistance.

The alkyl (meth)acrylate may be a $C_1$ to $C_{20}$ alkyl (meth) acrylate. Examples of the alkyl (meth)acrylate may include methyl (meth)acrylate, ethyl (meth)acrylate, butyl (meth) acrylate, and 2-ethylhexyl (meth)acrylate, without being limited thereto. These may be used alone or as a mixture thereof.

In one embodiment, the alkyl (meth)acrylate may be present in an amount of about 65 wt % to about 80 wt % based on the total weight (100 wt %) of the aromatic vinyl copolymer. In some embodiments, the aromatic vinyl copolymer may include the alkyl (meth)acrylate in an amount of about 65, 66, 67, 68, 69, 70, 71, 72, 73, 74, 75, 76, 77, 78, 79, or 80 wt %. Further, according to some embodiments, the amount of the alkyl (meth)acrylate can be in a range from about any of the foregoing amounts to about any other of the foregoing amounts. Within this range, the thermoplastic resin composition can have good properties in terms of impact resistance and abrasion resistance. For example, the alkyl (meth)acrylate may be present in an amount of about 70 wt % to about 80 wt % based on the total weight of the aromatic vinyl copolymer.

Examples of the aromatic vinyl monomer may include styrene, α-methylstyrene, β-methyl styrene, p-methyl styrene, p-t-butyl styrene, ethyl styrene, vinylxylene, monochlorostyrene, dichlorostyrene, dibromostyrene, vinyl naphthalene, and combinations thereof, without being limited thereto. For example, the aromatic vinyl monomer may be styrene.

In one embodiment, the aromatic vinyl monomer may be present in an amount of about 10 wt % to about 30 wt % based on the total weight (100 wt %) of the aromatic vinyl copolymer. In some embodiments, the aromatic vinyl copolymer may include the aromatic vinyl monomer in an amount of about 10, 11, 12, 13, 14, 15, 16, 17, 18, 19, 20, 21, 22, 23, 24, 25, 26, 27, 28, 29, or 30 wt %. Further, according to some embodiments, the amount of the aromatic vinyl monomer can be in a range from about any of the foregoing amounts to about any other of the foregoing amounts. Within this range, the thermoplastic resin composition can have good properties in terms of impact resistance and/or abrasion resistance. For example, the aromatic vinyl monomer may be present in an amount of about 15 wt % to about 25 wt % based on the total weight of the aromatic vinyl copolymer.

Examples of the monomer copolymerizable with the aromatic vinyl monomer may include: a vinyl cyanide monomer such as acrylonitrile, methacrylonitrile, and ethacrylonitrile; and/or a monomer imparting processability and heat resistance such as acrylic acid, (meth)acrylic acid, maleic anhydride, and N-substituted maleimide, without being limited thereto. These may be used alone or as a mixture thereof.

In one embodiment, the monomer copolymerizable with the aromatic vinyl monomer may be present in an amount of about 2 wt % to about 10 wt % based on the total weight (100 wt %) of the aromatic vinyl copolymer. In some embodiments, the aromatic vinyl copolymer may include the monomer copolymerizable with the aromatic vinyl monomer in an amount of about 2, 3, 4, 5, 6, 7, 8, 9, or 10 wt %. Further, according to some embodiments, the amount of the monomer copolymerizable with the aromatic vinyl monomer can be in a range from about any of the foregoing amounts to about any other of the foregoing amounts. Within this range, the thermoplastic resin composition can have good properties in terms of impact resistance and/or abrasion resistance. For example, the monomer copolymerizable with the aromatic vinyl monomer may be present in an amount of about 2 wt % to about 8 wt % based on the total weight of the aromatic vinyl copolymer.

In one embodiment, the aromatic vinyl copolymer may have a weight average molecular weight (Mw) of about 10,000 g/mol to 300,000 g/mol, as measured by gel permeation chromatography (GPC). Within this range, the thermoplastic resin composition can have good properties in terms of impact resistance, rigidity, and/or moldability. For example, the aromatic vinyl copolymer may have a weight average molecular weight (Mw) of about 15,000 g/mol to 200,000 g/mol.

In one embodiment, the aromatic vinyl copolymer may be present in an amount of about 5 wt % to about 60 wt % based on the total weight (100 wt %) of the base resin (A) including the (A1) poly(alkyl (meth)acrylate) resin and (A2) copolymer of an alkyl (meth)acrylate. In some embodiments, the base resin may include the aromatic vinyl copolymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the aromatic vinyl copolymer can be in a range from about any of the foregoing amounts to about any other of the foregoing amounts. Within this range, the aromatic vinyl copolymer can have good compatibility and/or miscibility and the thermoplastic resin composition can have good properties in terms of impact resistance, rigidity, discoloration resistance, color, and balance therebetween. For example, the aromatic vinyl copolymer may be present in an amount of about 5 wt % to about 45 wt %. By way of another example, the aromatic vinyl copolymer may be present in an amount of about 10 wt % to about 35 wt %. By way of a further example, the aromatic vinyl copolymer may be present in an amount of about 10 wt % to about 20 wt %.

In one embodiment, in the base resin (A), a weight ratio of the poly(alkyl (meth)acrylate) resin (A1) to the aromatic vinyl copolymer (A2) may range from about 1:0.1 to about 1:0.6. In some embodiments, the weight ratio of the poly (alkyl (meth)acrylate) resin (A1) to the aromatic vinyl copolymer (A2) may be about 1:0.1, 1:0.2, 1:0.3, 1:0.4, 1:0.5, or 1:0.6. Within this range, the base resin can have good compatibility and the thermoplastic resin composition can have good properties in terms of impact resistance, abrasion resistance, and/or chemical resistance. For example, a weight ratio of the poly(alkyl (meth)acrylate) resin (A1) to the aromatic vinyl copolymer (A2) may range from about 1:0.1 to about 1:0.3.

(B) Polyether-Ester-Amide Block Copolymer

In one embodiment, the polyether-ester-amide block copolymer may include: (B1) a $C_6$ or more aminocarboxylic acid, lactam and/or diamine-dicarboxylic acid salt; (B2) a poly(alkylene oxide) glycol; and (B3) a $C_4$ to $C_{20}$ dicarboxylic acid.

In one embodiment, the polyether-ester-amide block copolymer may include a structure represented by Formula 1:

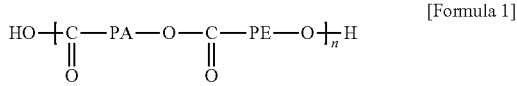
[Formula 1]

wherein PA is

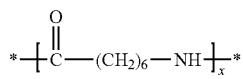

(wherein x is an integer of 1 to 5 and * is a binding site), and PE is

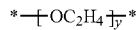

(wherein y is an integer of 1 to 5 and * is a binding site), and n is an integer of 1 to 1,000.

In one embodiment, the $C_6$ or more aminocarboxylic acid, lactam, and/or diamine-dicarboxylic acid salt (B1) may include: aminocarboxylic acids such as ω-aminocaproic acid, ω-aminoenanthic acid, ω-aminocaprylic acid, ω-aminopelargonic acid, ω-aminocapric acid, 1,1-aminoundecanoic acid, and 1,2-aminododecanoic acid; lactams such as caprolactam, enanthic lactam, caprylic lactam, and lauryl lactam; salts of diamine and dicarboxylic acid such as hexamethylenediamine-adipic acid salt and hexamethylenediamine-isophthalic acid salt; and the like, and mixtures thereof. For example, the $C_6$ or more aminocarboxylic acid, lactam, and/or diamine-dicarboxylic acid salt (B1) may be 1,2-aminododecanoic acid, caprolactam, and/or hexamethylenediamine-adipic acid salt.

In one embodiment, the poly(alkylene oxide) glycol (B2) may include poly(ethylene oxide) glycol, poly(1,2-propylene oxide) glycol, poly(1,3-propylene oxide) glycol, poly(tetramethylene oxide) glycol, poly(hexamethylene oxide) glycol, a block and/or random copolymer of ethylene oxide and propylene oxide, and/or a copolymer of ethylene oxide and tetrahydrofuran. For example, the poly(alkylene oxide) glycol may be poly(ethylene oxide)glycol and/or a copolymer of poly(ethylene oxide) and propylene oxide.

In one embodiment, the $C_4$ to $C_{20}$ dicarboxylic acid (B3) may include terephthalic acid, 1,4-cyclohexarboxylic acid, sebacic acid, adipic acid, and/or dodecanecarboxylic acid. As a diamine, hexamethylenediamine may be used.

In the polyether-ester-amide copolymer (B), a bond of the $C_6$ or more aminocarboxylic acid, lactam and/or diamine-dicarboxylic acid salt (B1) and the poly(alkylene oxide) glycol (B2) is an ester or amide bond, wherein the $C_4$ to $C_{20}$ dicarboxylic acid (B3) or the diamine may be added to the bond.

Although a method of preparing the polyether-ester-amide copolymer (B) is not particularly limited, the polyether-ester-amide copolymer (B) may be prepared by methods disclosed in Japanese Patent Publication No. Sho 56-045419 and Japanese Patent Publication No. Sho 55-133424.

The polyether-ester-amide copolymer (B) may include about 10 wt % to about 95 wt % of a polyether-ester block. In some embodiments, the polyether-ester-amide copolymer (B) may include the polyether-ester block in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the polyether-ester block can be in a range from about any of the foregoing amounts to about any other of the foregoing amounts. Within this range, the thermoplastic resin composition can have good mechanical properties and/or antistatic properties.

In one embodiment, the polyether-ester-amide block copolymer (B) may be present in an amount of about 5 parts by weight to about 50 parts by weight relative to about 100 parts by weight of the base resin (A). In some embodiments, the thermoplastic resin composition may include the polyether-ester-amide copolymer (B) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments, the amount of the polyether-ester-amide copolymer can be in a range from about any of the foregoing amounts to about any other of the foregoing amounts. Within this range, the polyether-ester-amide block copolymer (B) can have good compatibility with the base resin (A) and the thermoplastic resin composition can have good mechanical properties and/or antistatic properties.

For example, the polyether-ester-amide block copolymer (B) may be present in an amount of about 15 parts by weight to about 45 parts by weight relative to about 100 parts by weight of the base resin (A). By way of another example, the polyether-ester-amide block copolymer (B) may be present in an amount of about 25 parts by weight to 35 parts by weight relative to about 100 parts by weight of the base resin (A).

In one embodiment, in the thermoplastic resin composition, a weight ratio of the poly(alkyl (meth)acrylate) resin (A1) to the polyether-ester-amide block copolymer (B) may range from about 1:0.1 to about 1:1. In some embodiments, the weight ratio of the poly(alkyl (meth)acrylate) resin (A1) to the polyether-ester-amide block copolymer (B) may be about 1:0.1, 1:0.2, 1:0.3, 1:0.4, 1:0.5, 1:0.6, 1:0.7, 1:0.8, 1:0.9, or 1:1. Within this range, the poly(alkyl (meth)acrylate) resin (A1) can have good compatibility with the polyether-ester-amide block copolymer (B) and the thermoplastic resin composition can have good properties in terms of antistatic performance, impact resistance, abrasion resistance and/or chemical resistance. For example, a weight ratio of the poly(alkyl (meth)acrylate) resin (A1) to the polyether-ester-amide block copolymer (B) may range from about 1:0.2 to about 1:0.5.

(C) Zinc Oxide

The zinc oxide (C) serves to improve antibacterial properties (activity) of the thermoplastic resin composition. In one embodiment, the zinc oxide may have an average particle diameter of about 0.2 μm to about 3 μm, for example, about 0.3 μm to about 2 μm, as measured using a particle analyzer, a BET specific surface area of about 1 m²/g to about 40 m²/g, for example, about 1 m²/g to about 20 m²/g, as another example about 1 m²/g to about 15 m²/g, and as another example about 1 m²/g to about 10 m²/g, and a purity of about 97% or higher, for example, 99% or higher. If these parameters of the zinc oxide are outside these ranges, the thermoplastic resin composition can suffer from deterioration in antibacterial activity and/or optical properties.

In some embodiments, the zinc oxide may have an average particle diameter (D50) of about 0.2, 0.3, 0.4, 0.5, 0.6, 0.7, 0.8, 0.9, 1, 2, or 3 μm. Average particle diameter can be measured in a single particle state (not forming a secondary particle through agglomeration of particles) using a particle analyzer (Laser Diffraction Particle Size Analyzer LS I3 320, Beckman Coulter Co., Ltd.) as known in the art and as understood by the skilled artisan.

In some embodiments, the zinc oxide may have a BET specific surface area of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 m²/g as measured by a nitrogen gas adsorption method using a BET analyzer (Surface Area and Porosity Analyzer ASAP 2020, Micromeritics Co., Ltd.).

In one embodiment, the zinc oxide may be prepared by melting metallic zinc in a reactor, heating the molten zinc to about 850° C. to about 1,000° C., for example, about 900° C. to about 950° C., to vaporize the molten zinc, cooling the vaporized zinc to a temperature of about 20° C. to about 30° C. while injecting oxygen gas into the reactor, heating the cooled zinc to about 700° C. to about 800° C. for about 30 minutes to about 150 minutes while injecting nitrogen/hydrogen gas into the reactor, and cooling the heated zinc to room temperature (about 20° C. to about 30° C.).

In one embodiment, the zinc oxide may have a peak intensity ratio (B/A) of about 0.01 to about 15.0, for example, about 0.1 to about 1.0, where A indicates a peak in the wavelength range of 370 nm to 390 nm and B indicates a peak in the wavelength range of 450 nm to 600 nm in photoluminescence measurement. In some embodiments, the zinc oxide may have a peak intensity ratio (B/A) of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10.0, 11.0, 12.0, 13.0, 14.0, or 15.0. Within this range, the thermoplastic resin composition can have further improved antibacterial activity.

In one embodiment, the zinc oxide may have a peak position degree (2θ) in the range of 35° to 37° and a crystallite size of about 500 Å to about 2,000 Å, for example, about 500 Å to about 1,800 Å in analysis of X-ray diffraction (XRD) as calculated by Scherrer's Equation (Equation 1) with reference to a measured FWHM value (full width at half maximum of a diffraction peak). Within this range, the thermoplastic resin composition can have good antibacterial activity.

$$\text{Crystallite size } (D) = \frac{K\lambda}{\beta \cos\theta} \qquad \text{[Equation 1]}$$

where K is a shape factor, λ is an X-ray wavelength, β is an FWHM value (degree) of an X-ray diffraction peak, and θ is a peak position degree.

In one embodiment, the zinc oxide may be present in an amount of about 0.01 parts by weight to about 5 parts by weight relative to about 100 parts by weight of the base resin (A). In some embodiments, the thermoplastic resin composition may include the zinc oxide in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight.

Further, according to some embodiments, the amount of the zinc oxide can be in a range from about any of the foregoing amounts to about any other of the foregoing amounts. Within this range, the thermoplastic resin composition can have good antibacterial activity with minimal or no deterioration in appearance characteristics such as transparency. For example, the zinc oxide may be present in an amount of about 0.01 parts by weight to about 3 parts by weight relative to about 100 parts by weight of the base resin (A). By way of another example, the zinc oxide may be present in an amount of about 0.01 parts by weight to about 1 part by weight relative to about 100 parts by weight of the base resin (A).

In one embodiment, the thermoplastic resin composition may further include any typical additive included in thermoplastic resin compositions. Examples of the additive may include a flame retardant, fillers, an antioxidant, an anti-dripping agent, a lubricant, a release agent, a nucleating agent, a pigment, a dye, and combinations thereof, without being limited thereto. When the thermoplastic resin composition includes the additive, the additive may be present in an amount of about 0.001 parts by weight to about 40 parts by weight relative to about 100 parts by weight of the thermoplastic resin composition. For example, the additive may be present in an amount of about 0.1 parts by weight to about 10 parts by weight relative to about 100 parts by weight of the thermoplastic resin composition.

In one embodiment, the thermoplastic resin composition may be prepared in pellet form by mixing the aforementioned components, followed by melt extrusion using a typical twin-screw extruder at about 200° C. to about 280° C., for example, about 220° C. to about 250° C.

In one embodiment, the thermoplastic resin composition may have an impact resistance of about 900 mm or higher, wherein the impact resistance indicates a height from which dropping a1 kg metal tip results in cracking of a 3.2 mm thick specimen in a Dupont drop impact test. For example, the thermoplastic resin composition may have an impact resistance of about 900 mm to 1,300 mm.

In one embodiment, the thermoplastic resin composition may have an antibacterial activity of about 2.0 to about 7.5 (against *Staphylococcus*) and about 2.0 to about 7.5 (against *Escherichia coli*), for example, about 2.0 to about 7.0 (against *Staphylococcus*) and about 2.0 to about 7.0 (against *Escherichia coli*), and as another example, about 3.5 to about 4.5 (against *Staphylococcus*) and about 4.5 to about 6.5 (against *Escherichia coli*), as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% relative humidity (RH) for 24 hours.

In one embodiment, the thermoplastic resin composition may have a surface resistance of about $10^5$ Ω·cm to about $10^{10}$ Ω·cm, as measured in accordance with ASTM D257. For example, the thermoplastic resin composition may have a surface resistance of about $10^6$ Ω·cm to about $10^{10}$ Ω·cm.

In accordance with other embodiments, a molded article is formed of the thermoplastic resin composition as set forth above. The thermoplastic resin composition may be prepared in pellet form. The prepared pellets may be formed into a molded article (product) by various molding methods such as injection molding, extrusion, vacuum molding, and casting. Such molding methods are well known to those skilled in the art.

The molded article can have good properties in terms of antibacterial activity, antistatic performance, abrasion resistance, impact resistance, flowability (moldability), and balance therebetween, and thus may be used, without limitation, as an exterior material for electric/electronic products, a material for medical supplies requiring antibacterial properties, and the like.

Next, the present invention will be described in more detail with reference to the following examples. It should be understood that these examples are provided for illustration only and are not to be in any way construed as limiting the present invention.

EXAMPLES AND COMPARATIVE EXAMPLES

Details of components used in Examples and Comparative Examples are as follows.
(A) Base resin
(A1) Poly(alkyl (meth)acrylate) resin: Poly(methyl (meth)acrylate) (PMMA) resin (TF9, LOTTE MRC Corp.)
(A2) Aromatic vinyl copolymer: A methyl methacrylate-styrene-acrylonitrile (MSAN) copolymer (weight average molecular weight: 90,000 g/mol) obtained by polymerization of 74 wt % of methyl methacrylate, 21 wt % of styrene, and 5 wt % of acrylonitrile
(B) Polyether-ester-amide block copolymer: Pelestat AS (SANYO Chemical Industries, Ltd.).
(C) Zinc oxide
(C1) Dried zinc oxide having an average particle diameter, a BET surface area, a purity, a peak intensity ratio (B/A) of peak A in the wavelength range of 370 nm to 390 nm to peak B in the wavelength range of 450 nm to 600 nm in photoluminescence measurement, and a crystallite size as listed in Table 1
(C2) Dried zinc oxide having an average particle diameter, a BET surface area, a purity, a peak intensity ratio (B/A) of peak A in the wavelength range of 370 nm to 390 nm to peak B in the wavelength range of 450 nm to 600 nm in photoluminescence measurement, and a crystallite size as listed in Table 1
(C3) Wet zinc oxide having an average particle diameter, a BET surface area, a purity, a peak intensity ratio (B/A) of peak A in the wavelength range of 370 nm to 390 nm to peak B in the wavelength range of 450 nm to 600 nm in photoluminescence measurement, and a crystallite size as listed in Table 1.

TABLE 1

| Item | (C1) | (C2) | (C3) |
|---|---|---|---|
| Average particle diameter (μm) | 1.2 | 1.0 | 1.1 |
| BET surface area (m²/g) | 4.0 | 6.0 | 15 |
| Purity (%) | 99 | 99 | 97 |
| PL peak intensity ratio (B/A) | 0.28 | 0.05 | 9.8 |
| Crystallite size (Å) | 1417 | 1229 | 503 |

Property Evaluation of Zinc Oxide (1) Average particle diameter (unit: μm): Average particle diameter is measured using a particle analyzer (Laser Diffraction Particle Size Analyzer LS I3 320, Beckman Coulter Co., Ltd.).

(2) BET surface area (unit: m²/g): BET surface area is measured by a nitrogen gas adsorption method using a BET analyzer (Surface Area and Porosity Analyzer ASAP 2020, Micromeritics Co., Ltd.).

(3) Purity (unit: %): Purity is measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature is detected by a CCD detector in a photoluminescence measurement method, in which the CCD detector is maintained at −70° C. A peak intensity ratio (B/A) of peak A in the wavelength range of 370 nm to 390 nm to peak B in the wavelength range of 450 nm to 600 nm is measured. Here, an injection molded specimen is irradiated with laser beams without separate treatment upon PL analysis, and zinc oxide powder is compressed in a pelletizer having a diameter of 6 mm to prepare a flat specimen.

(5) Crystallite size (unit: Å): Crystallite size is measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used in this test. For more accurate analysis, the injection molded specimen is subjected to heat treatment at 600° C. in air for 2 hours to remove a polymer resin therefrom before XRD analysis.

$$\text{Crystallite size }(D) = \frac{K\lambda}{\beta\cos\theta} \qquad \text{[Equation 1]}$$

where K is a shape factor, λ is an X-ray wavelength, β is an FWHM value (degree) of an X-ray diffraction peak, and θ is a peak position degree.

Examples 1 to 9 and Comparative Examples 1 to 4

The aforementioned components are mixed in amounts as listed in Tables 2 to 3, followed by melt extrusion at 230° C., thereby preparing a thermoplastic resin composition in pellet form. Extrusion is performed using a twin-screw extruder (L/D=36, φ 45 mm). The prepared pellets are dried at 80° C. for 2 hours or more, followed by injection molding using a 6 oz. injection molding machine (molding temperature: 230° C., mold temperature: 60° C.), thereby preparing a specimen. The prepared specimen is evaluated as to the following properties and results are shown in Tables 2 to 3.

Property Evaluation (1) Impact resistance (mm): In accordance with a Dupont drop impact test, using a 500 g weight with a rubber tip (Condition 1) and a 1 kg weight with a metal tip (Condition 2), a height from dropping the weight results in cracking of a 3.2 mm thick specimen (10 cm×10 cm×3.2 mm) is measured.

(2) Surface resistance (Ω·cm): Surface resistance is measured in accordance with ASTM D257.

(3) Antibacterial activity: Antibacterial activity is measured on a 5 cm×5 cm specimen obtained by inoculation with each of *Staphylococcus aureus* and *Escherichia coli*, followed by culturing under conditions of 35° C. and 90% RH for 24 hours, in accordance with JIS Z 2801.

(4) Abrasion resistance: An abrasion resistance test is conducted 10 times using a crack meter. Scratches on a surface of the specimen are observed with varying viewing angle, followed by evaluation according to the following criteria:

1: No scratch is observed at all viewing angles. 2: Scratches are observed at specific viewing angles. 3: Scratches are observed at all viewing angles.

(5) Chemical resistance: Chemical resistance is measured using a ¼" elliptical jig model. Specifically, a 3.2 mm thick specimen is placed on the jig, followed by application of an IPA solution to the specimen, and then a point of time at which the specimen suffers cracking and positions of cracks are measured.

TABLE 2

| (Unit: parts by weight) | | Example 1 | Example 2 | Example 3 | Example 4 | Example 5 | Example 6 |
|---|---|---|---|---|---|---|---|
| (A) | (A1) | 83 | 83 | 83 | 83 | 83 | 83 |
| | (A2) | 17 | 17 | 17 | 17 | 17 | 17 |
| | (B) | 10 | 30 | 50 | 30 | 30 | 30 |
| (C) | (C1) | 0.1 | 0.1 | 0.1 | 0.05 | 1.0 | — |
| | (C2) | — | — | — | — | — | 0.05 |
| Impact resistance (mm) | | 950 | 1,000 | 1,200 | 1,000 | 1,000 | 1,000 |
| Surface resistance ($\Omega \cdot$ cm) | | $10^{10}$ | $10^8$ | $10^7$ | $10^8$ | $10^8$ | $10^8$ |
| Antibacterial activity | Staphylococcus aureus | 4.6 | 4.6 | 4.6 | 4.6 | 4.6 | 4.6 |
| | Escherichia coli | 3.8 | 6.3 | 6.3 | 6.3 | 6.3 | 6.3 |
| Abrasion resistance | | 1 | 1 | 1 | 1 | 1 | 1 |
| Chemical resistance | | No crack | No crack | No crack | No crack | No crack | No crack |

TABLE 3

| (Unit: parts by weight) | | Example 7 | Example 8 | Example 9 | Comparative Example 1 | Comparative Example 2 | Comparative Example 3 | Comparative Example 4 |
|---|---|---|---|---|---|---|---|---|
| (A) | (A1) | 83 | 83 | 83 | 83 | 83 | 83 | 83 |
| | (A2) | 17 | 17 | 17 | 17 | 17 | 17 | 17 |
| | (B) | 30 | 30 | 30 | — | — | 30 | 3 |
| (C) | (C1) | — | — | — | — | 0.1 | — | — |
| | (C2) | 1.0 | — | — | — | — | — | — |
| | (C3) | — | 0.05 | 0.1 | — | — | — | 0.1 |
| Impact resistance (mm) | | 1,000 | 1,000 | 1,000 | 50 | 50 | 1,000 | 200 |
| Surface resistance ($\Omega \cdot$ cm) | | $10^8$ | $10^8$ | $10^8$ | $10^{13}$ | $10^{13}$ | $10^8$ | $10^{11}$ |
| Antibacterial activity | Staphylococcus aureus | 4.6 | 4.6 | 4.6 | 0.5 | 1.6 | 1.8 | 1.0 |
| | Escherichia coli | 6.3 | 6.3 | 6.3 | 0.8 | 0.3 | 1.8 | 1.3 |
| Abrasion resistance | | 1 | 1 | 1 | 3 | 3 | 1 | 3 |
| Chemical resistance | | No crack | No crack | No crack | 0.5 cm Breaking | 0.5 cm Breaking | No crack | 0.5 cm Breaking |

FIG. 1(a) shows a result of evaluating abrasion resistance of Example 1 according to the present invention and FIG. 1(b) shows a result of evaluating abrasion resistance of Comparative Example 1. In addition, FIG. 2(a) shows a result of evaluating impact resistance of Example 1 according to the present invention (under Condition 2) and FIG. 2(b) shows a result of evaluating impact resistance of Comparative Example 1 (under Condition 1).

Figure 2:
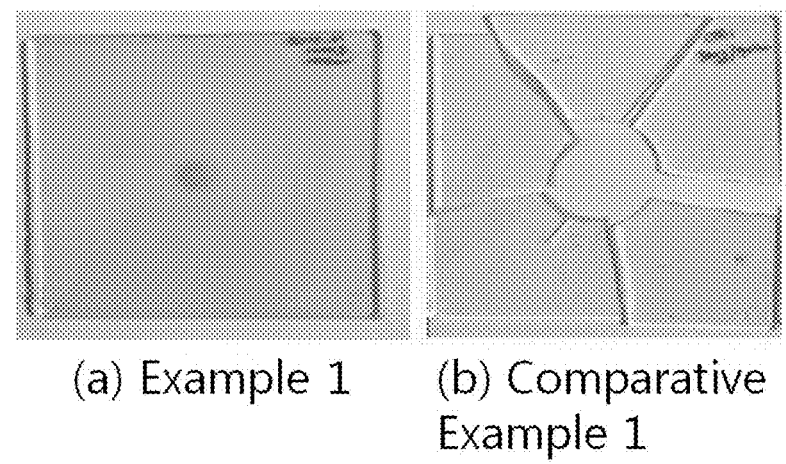
FIG. 2(a) shows a result of evaluating impact resistance of Example 1 according to the present invention.
FIG. 2(b) shows a result of evaluating impact resistance of Comparative Example 1.

Referring to Tables 2 and 3 and FIGS. 1 and 2, it can be seen that the thermoplastic resin composition according to the present invention has good properties in terms of chemical resistance, impact resistance, antistatic performance, abrasion resistance, and antibacterial resistance.

Conversely, the thermoplastic resin composition of Comparative Example 1 without zinc oxide and the polyether-ester-amide block copolymer according to the present invention and the thermoplastic resin composition of Comparative Example 2 without polyether-ester-amide block copolymer have poor properties in terms of antistatic performance, impact resistance, abrasion resistance, chemical resistance, and antibacterial resistance, as compared with the thermoplastic resin compositions of Examples 1 to 9; the thermoplastic resin composition of Comparative Example 3 without zinc oxide according to the present invention has poor properties in terms of antibacterial resistance, as compared with the thermoplastic resin compositions of Examples 1 to 9; the thermoplastic resin composition of Comparative Example 4 including the polyether-ester-amide block copolymer in an amount outside the amount range according to the present invention has poor properties in terms of impact resistance, chemical resistance, abrasion resistance, and antibacterial resistance, as compared with the thermoplastic resin compositions of Examples 1 to 9.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 100 parts by weight of a base resin comprising about 40 wt % to 95 wt % of a poly(alkyl (meth) acrylate) resin and about 5 wt % to 60 wt % of an aromatic vinyl copolymer consisting of an alkyl (meth) acrylate, an aromatic vinyl monomer, and a vinyl cyanide monomer;
   about 5 parts by weight to 50 parts by weight of a polyether-ester-amide block copolymer; and 0.01 parts by weight to 5 parts by weight of zinc oxide, the zinc oxide having an average particle diameter of about 0.2 μm to about 3 μm and a BET specific surface area of about 1 m²/g to about 20 m2/g.

2. The thermoplastic resin composition according to claim 1, wherein, in the base resin, a weight ratio of the poly(alkyl (meth)acrylate) resin to the aromatic vinyl copolymer ranges from about 1:0.1 to about 1:0.6.

3. The thermoplastic resin composition according to claim 1, comprising the poly(alkyl (meth)acrylate) resin and the polyether-ester-amide block copolymer in a weight ratio of about 1:0.1 to about 1:1.

4. The thermoplastic resin composition according to claim 1, wherein the aromatic vinyl copolymer is a copolymer consisting of about 65 wt % to about 80 wt % of the alkyl (meth)acrylate, about 10 wt % to about 30 wt % of the aromatic vinyl monomer, and about 2 wt % to about 10 wt % of the vinyl cyanide monomer.

5. The thermoplastic resin composition according to claim 1, wherein the polyether-ester-amide block copolymer comprises about 10 wt % to about 95 wt % of a polyether-ester block.

6. The thermoplastic resin composition according to claim 1, wherein the zinc oxide has a peak position degree (2θ) in the range of 35° to 37° and a crystallite size of about 500 Å to about 2,000 Å in analysis of X-ray diffraction (XRD), as calculated by Equation 1:

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

7. The thermoplastic resin composition according to claim 1, wherein the zinc oxide has a peak intensity ratio (B/A) of about 0.01 to about 15.0, where A indicates intensity of the peak in the wavelength range of 370 nm to 390 nm and B indicates intensity of the peak in the wavelength range of 450 nm to 600 nm in photoluminescence measurement.

8. The thermoplastic resin composition according to claim 7, wherein the zinc oxide has a peak intensity ratio (B/A) of about 0.01 to about 1.0, where A indicates intensity of the peak in the wavelength range of 370 nm to 390 nm and B indicates intensity of the peak in the wavelength range of 450 nm to 600 nm in photoluminescence measurement.

9. The thermoplastic resin composition according to claim 1, wherein the thermoplastic resin composition has an impact resistance of about 900 mm or higher, the impact resistance indicating a height from which dropping al kg metal tip results in cracking of a 3.2 mm thick specimen in a Dupont drop impact test.

10. The thermoplastic resin composition according to claim 1, wherein the thermoplastic resin composition has an antibacterial activity of about 2.0 to about 7.5 (against *Staphylococcus*) and about 2.0 to about 7.5 (against *Escherichia coli*), as measured on a 5 cm×5 cm specimen in accordance with JIS Z 2801 after the specimen is subjected to inoculation with each of *Staphylococcus aureus* and *Escherichia coli*, followed by culturing under conditions of 35° C. and 90% RH for 24 hours.

11. The thermoplastic resin composition according to claim 1, wherein the thermoplastic resin composition has a surface resistance of about $10^5$ Ω·cm to about $10^{10}$ Ω·cm, as measured in accordance with ASTM D257.

12. A molded article formed of the thermoplastic resin composition according to claim 1.

13. The thermoplastic resin composition according to claim 1, wherein the poly(alkyl (meth)acrylate) resin consists of one or more $C_1$ to $C_{14}$ alkyl group-containing (meth)acrylate monomers.

* * * * *